United States Patent
Steffen et al.

(10) Patent No.: US 8,520,303 B2
(45) Date of Patent: Aug. 27, 2013

(54) SURGICAL MICROSCOPE HAVING AN ILLUMINATING SYSTEM AND CONTROL UNIT THEREFOR

(75) Inventors: Joachim Steffen, Westhausen (DE); Helmut Riesenegger, Guenzburg (DE); Klaus Abele, Schwaebisch Gmuend (DE); Hartmut Gaertner, Oberkochen (DE); Juergen Liegel, Oberkochen (DE); Gerhard Herrmann, Aalen (DE); Juergen Kahler, Essingen (DE)

(73) Assignee: Carl Zeiss Meditec AG, Jena (DE)

( * ) Notice: Subject to any disclaimer, the term of this patent is extended or adjusted under 35 U.S.C. 154(b) by 605 days.

(21) Appl. No.: 12/662,984

(22) Filed: May 14, 2010

(65) Prior Publication Data
US 2010/0302629 A1  Dec. 2, 2010

Related U.S. Application Data

(63) Continuation of application No. PCT/EP2008/065483, filed on Nov. 13, 2008.

(30) Foreign Application Priority Data

Nov. 14, 2007  (DE) .......................... 10 2007 054 686

(51) Int. Cl.
*G02B 21/06* (2006.01)
(52) U.S. Cl.
CPC ...................................... *G02B 21/06* (2013.01)
USPC ....................................................... 359/385
(58) Field of Classification Search
None
See application file for complete search history.

(56) References Cited

U.S. PATENT DOCUMENTS

| 4,998,810 | A | 3/1991 | Sander et al. |
| 5,140,458 | A | 8/1992 | Takagi et al. |
| 5,748,367 | A | 5/1998 | Lücke et al. |
| 7,505,201 | B2 | 3/2009 | Oelckers et al. |
| 2004/0057108 | A1 | 3/2004 | Namii |
| 2007/0033680 | A1* | 2/2007 | Takahashi ..................... 977/869 |

FOREIGN PATENT DOCUMENTS

| DE | 203 10 548 U1 | 11/2004 |
| JP | 9-274141 | 10/1997 |

OTHER PUBLICATIONS

English translation of the Office action of the German Patent Office dated Oct. 22, 2008 in German patent application 10 2007 054 686.8 on which the claim of priority is based.
International Preliminary Report on Patentability of the international searching authority dated Jun. 1, 2010 in international patent application PCT/EP2008/065483 on which the claim of priority is based and English translation thereof.

(Continued)

*Primary Examiner* — Derek S Chapel
(74) *Attorney, Agent, or Firm* — Walter Ottesen P.A.

(57) ABSTRACT

A surgical microscope (100) has a viewing optic (101, 104, 115) which allows a viewing person to view the enlarged display of an object region (116) in a viewing area (117). The viewing optic (101, 104, 115) has a continuously adjustable magnification system (104) with which a viewing optic adjusting unit (119) is associated. The surgical microscope (100) has an adjustable illuminating system (150), which provides illuminating light (151) for the object region (116), to illuminate the object region in an illuminated area (152) using illuminating light (151) of adjustable radiation intensity. An illumination system control unit (175) is provided in the surgical microscope (100), the control unit being connected to the viewing optic adjusting unit (119) for receiving information as to the adjusted magnification of the viewing optic (101, 104, 115).

11 Claims, 6 Drawing Sheets

(56) References Cited

OTHER PUBLICATIONS

English translation of the first Office action of the Chinese Patent Office dated Jun. 24, 2011 in the corresponding Chinese patent application 200880113554.5.

English translation of the second Office action of the Chinese Patent Office dated Jan. 11, 2012 in the corresponding Chinese patent application 200880113554.5.

* cited by examiner

SURGICAL MICROSCOPE HAVING AN ILLUMINATING SYSTEM AND CONTROL UNIT THEREFOR

CROSS REFERENCE TO RELATED APPLICATIONS

This application is a continuation application of international patent application PCT/EP 2008/065483, filed Nov. 13, 2008, designating the United States and claiming priority from German application 10 2007 054 686.8, filed Nov. 14, 2007, and the entire content of both applications is incorporated herein by reference.

FIELD OF THE INVENTION

The invention relates to a surgical microscope having a viewing optic which permits the magnified presentation of an object region in a viewing area to a viewing person. The viewing optic includes a continuously adjustable magnification system to which an adjusting unit for the viewing optic is assigned. The surgical microscope also has an adjustable illuminating system which makes illuminating light available for the object region in order to illuminate the object region in an adjustable illuminated area with illuminating light of adjustable radiation intensity. An illumination system control unit is provided which is connected to the viewing optic adjusting unit for receiving data as to the adjusted magnification of the viewing optic. The control unit is operatively connected to the illumination system in order to adjust the same for an adaptation of the size of the illuminated area to the size of the viewing area.

BACKGROUND OF THE INVENTION

A surgical microscope of the kind described above is disclosed in U.S. Pat. No. 5,140,458. There, a surgical microscope is described which has a viewing optic having an adjustable magnification and an illuminating unit having an adjustable illuminating optic. A coupling of the viewing optic to the optic of the illuminating unit is provided in order to adapt the size of the illuminated area to the size of the viewing area when varying the magnification of the viewing optic.

The surgical microscope disclosed in U.S. Pat. No. 5,748,367 discloses a surgical microscope having an adjustable imaging focal intercept. The surgical microscope has an illuminating system with which illuminating light can be generated for the object region. The focal intercept of the illuminating system is configured to be variable in order to be able to adapt the focal intercept of the illuminating system to the imaging focal intercept of the surgical microscope. A coupling mechanism is provided which couples the illuminating focal intercept to the imaging focal intercept of the surgical microscope. The magnification of the microscope and therewith the viewing area diameter changes when varying the imaging focal intercept. For this reason, the coupling of the illuminating focal intercept and the imaging focal intercept effects an adaptation of the diameter of the illuminated area to the diameter of the viewing area in the surgical microscope.

An adjustable illuminating system for a surgical microscope is also described in German utility model registration 203 10 548 U1. This system permits focusing the illuminating light for different illuminated area diameters. In this way, also the radiation intensity of the illuminating light in the illuminated area can be correspondingly varied.

U.S. Pat. No. 7,505,201 describes a method to optimally adjust the light power in the object plane for incident light microscopes which can be especially configured as surgical microscopes. When adjusting the illuminating system, the light intensity, which reaches the object region, can be controlled to prevent thermal damage to biological tissue under investigation with the microscope which damage can be attributed to excessively intense illuminating light.

High power light sources such as xenon lamps are used in surgical microscopes which are designed for neurosurgery and ENT surgery. In addition to the desired effect of a bright illumination of the object region, these light sources have the disadvantage that the tissue in the object region can be heated by the illuminating light made available by these light sources notwithstanding filtering out UV-light and infrared light. This brings with it the danger of thermal damage. Depending upon the power setting, the work distance and the bundling of the illuminating light directed to the object region, phototoxic reactions can be triggered in the tissue under investigation by the illuminating system in such surgical microscopes. There then occurs damage to the tissue.

In systems corresponding to the state of the art, it is left to the discretion of the viewing person, that is, as a rule, the operating surgeon, which radiation intensity the viewing person selects for illuminating the object region. The danger is well known to cognizant persons in this field that patient tissue can be damaged with illuminating light made available by the illuminating system in the surgical microscope. The manufacturers of surgical microscopes call attention to this danger in operating manuals and it is recommended to work with a light source power which is as low as possible. Surgeons often select a low lamp power setting at the start of a surgical procedure. With increasing the magnification of the optical viewing system in the surgical microscope, one must then, however, increase the light quantity directed to the region of surgery because, otherwise, the viewing area is too dark. When working with a surgical microscope, the area, which is illuminated by the illuminating system, is mostly set larger than the viewing area even when corresponding systems offer the possibility of reducing the illuminated area. This is because surgeons often do not use the possibility of reducing the illuminated area during a surgical procedure in a corresponding surgical microscope. However, the body tissue of the patient can be unnecessarily subjected to illuminating light.

SUMMARY OF THE INVENTION

It is an object of the invention to provide a surgical microscope which permits a surgeon to illuminate a region of surgery with an illuminating light in such a manner that the viewing image is sufficiently bright without danger of thermal damage to the patient tissue because of the illuminating light.

This object is realized with the surgical microscope of the kind described above wherein the illuminating system control unit controls the illuminating system in dependence upon the adjusted magnification of the viewing optic so that, in a first magnification range, the size of the illuminated area is varied in the object region at constant radiation intensity of the illuminating light and, in a second magnification range, the size of the illuminated area is adjusted while changing the radiation intensity.

In a further embodiment of the invention, the illuminating system includes an adjustable optic component assembly for adjusting the illuminated area. This adjustable optic component assembly preferably includes at least one displaceable lens element and an adjustable illuminated field diaphragm. A very reliable operation of the surgical microscope is made possible because the optical component assembly has a common drive element for the displacement of the lens element and the adjustment of the illuminated field diaphragm.

A rotatable shaft is provided as a drive element in accordance with another embodiment of the invention. Especially an electric motor is suitable for driving this shaft. Alternatively or in addition, a rotary knob can be assigned to the rotatable shaft for rotating the same.

According to another embodiment of the invention, the common drive element operates in such a manner on an illuminated field diaphragm adjusting mechanism that a drive force, which is introduced into the drive element, is transmitted to the illuminated field diaphragm when opening the illuminated field diaphragm as well as when closing the illuminated field diaphragm. Such an adjusting mechanism is capable of introducing relatively high adjusting forces into the illuminated field diaphragm. In this way, a reliable operation of the illuminated field diaphragm is possible even with frequent opening and closing over long time spans even though the actuating forces for the diaphragm increase over time because of mechanical wear of the movable elements.

According to another embodiment of the invention, the illuminating system includes a light source for the illuminating light. The light source is assigned a unit for adjusting an illuminating luminous flux of illuminating light from the light source. Preferably, the illuminating system contains a "Siebblende" for the adjustment of the illuminating luminous flux. A "Siebblende" is a diaphragm having a plurality of apertures formed therein and is hereinafter referred to as an apertured diaphragm. In this way, a threshold value for the phototoxicity for illuminating light, which is directed to the object region, can be precisely maintained.

In a further embodiment, an adjusting unit is assigned to the magnification system and adjusts the magnification of the viewing optic to a value selectable by the viewing person.

In another embodiment of the invention, the transmission of the viewing optic is essentially constant in the first magnification range and the transmission of the viewing optic decreases with increasing magnification in the second magnification range.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
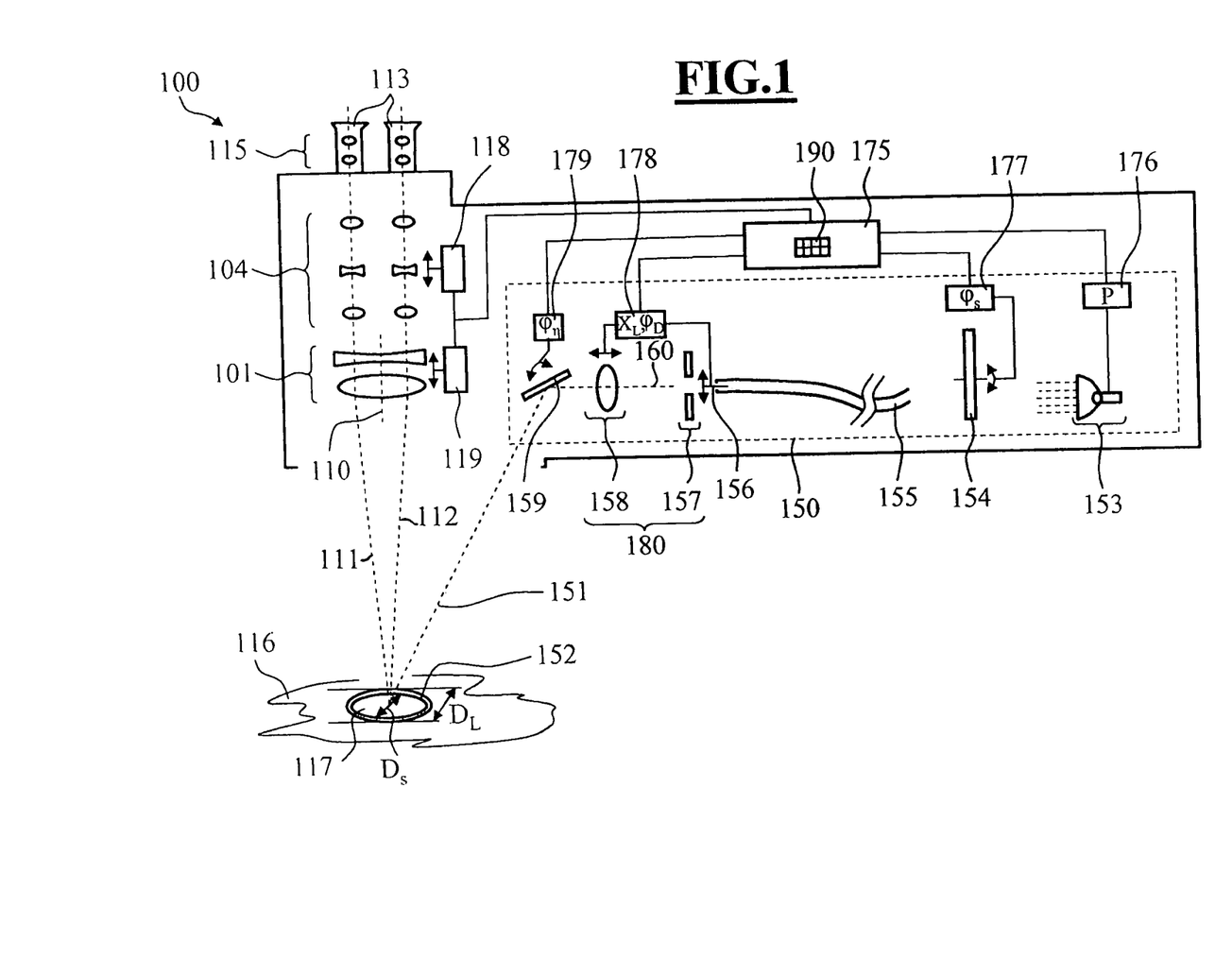
FIG. 1 is a schematic of a surgical microscope having an illuminating system and illuminating-system control unit.

The surgical microscope 100 of FIG. 1 has a viewing optic having a focusable microscope main objective system 101 defining an optical axis 110. The viewing optic of the surgical microscope includes a continuously adjustable magnification system 104 through which left and right viewing beam paths (111, 112) pass. The magnification system 104 is a three member zoom having displaceable lenses. The surgical microscope 100 permits a viewing person to view an object region 116 in a viewing area 117 with adjustable magnification by looking into a binocular tube 113 having an ocular optic 115.

An adjusting unit 119 is assigned to the focusable main objective system 101 and an adjusting unit 118 is assigned to the adjustable magnification system 104. Each of the adjusting units (118, 119) includes a motor drive (not shown).

The surgical microscope 100 has an illuminating system 150. The illuminating system 150 makes the illuminating light 151 available in an illuminated area 152 in the object region 116. The illuminating system 150 includes a xenon lamp 153 as a light source to which an apertured diaphragm (Siebblende) 154 is assigned. The light from the xenon lamp 153 is directed to a light conductor 155 via the apertured diaphragm 154. The illuminating system 150 includes an illuminated field diaphragm 157. This diaphragm 157 is illuminated by an illuminating light 156 exiting from the light conductor 155. The illuminating system 150 includes further an adjustable optic unit 158 and an adjustable mirror element 159. The illuminating light 160, which exits from the illuminated field diaphragm 157, is directed to the object region 116 via the adjustable optic unit 158 and the adjustable mirror element 159 and generates there the illuminated area 152.

An illuminating system control unit 175 is assigned to the illuminating system 150. The illuminating system control unit 175 is connected to a unit 176 for controlling the power of the xenon lamp 153 and a unit 177 for adjusting the apertured diaphragm 154. The unit for adjusting the apertured diaphragm 177 includes a motoric actuator (not shown in FIG. 1).

The adjustable optic unit 158 and the adjustable illuminated field diaphragm 157 conjointly define an adjustable optic component assembly 180. The illuminating system 150 includes an adjusting unit 178 for adjusting the optic unit 158 and the illuminated field diaphragm 157. The adjusting unit 178 likewise includes a motoric actuator (not shown in FIG. 1).

The mirror element 159 in the illuminating system 150 is configured so as to be adjustable. The illuminating system 150 has a drive unit 179 for adjusting the mirror element 159 and this drive unit is likewise connected to the illuminating system control unit 175.

By displacing the mirror element 159, the adjustable optic unit 158 and the illuminated field diaphragm 157, the size of the illuminated area 152 in the object plane of the microscope main objective system 101 can be adapted to the size of the viewing area 117 in the surgical microscope 100. For this purpose, the illuminating system control unit 175 having the adjusting units (118, 119) for the focusable main objective system 101 is connected to the magnification system 104.

An input unit 190 is assigned to the illuminating system control unit 175. This input unit 190 permits a configuration of the illuminating system control unit 175. In this way, the illuminating system control unit 175 can be adjusted for changed imaging parameters of the viewing optic in the surgical microscope when there is an exchange of the ocular optic 115 or of the microscope main objective 101. The information as to the magnification of the ocular optic 115 is stored in the illuminating system control unit 175. The instantaneously selected adjustment of the main objective system 101 and of the magnification system 104 is supplied by the adjusting units (118, 119) to the illuminating system control unit 175.

The illuminating system control unit 175 computes the size of the viewing area 117 from the magnification of the ocular optic 115, the magnification of the magnification system 104 and the adjustment of the microscope main objective system 101. More specifically, the diameter $D_S$ of the viewing area 117 in the object plane is computed. The object plane corresponds to the focal plane of the microscope main objective system 101.

For the computed diameter $D_S$ of the viewing area, the drive unit 179 for the mirror element 159 as well as the adjusting unit 178 for the optic component assembly 180 having the adjustable optic unit 158 and the illuminated field diaphragm 157 is so driven that the illuminated area 152 is adapted to the viewing area 117 of the surgical microscope 100. The illuminated area 152 is generated in the object region 116 by the illuminating system 150. An advantageous adaptation of the illuminated area 152 and the viewing area 117 comprises to adjust the diameter $D_L$ of the illuminated area 152 to the diameter $D_S$ of the viewing area 117. It is, however, also possible to so vary the diameter $D_L$ of the illuminated area 152 that this diameter is always somewhat greater than the diameter $D_S$ of the viewing area.

The illuminating system control unit 175 controls the optic component assembly 180 in the illuminating system 150 so that for large to medium illuminated areas, that is, sizes up to the medium illuminated area diameter $D_L$, the optic unit 158 is adjusted without a simultaneous variation of the illuminated field diaphragm 157.

In contrast, to adjust medium and small illuminated areas, that is, for medium and small diameters $D_L$ of the illuminated area, the adjustment of the optic unit 158 is held unchanged and only the opening of the illuminated field diaphragm 157 is varied.

Because of the automatic coupling of the illuminated area size to the viewing area size, it is always ensured that, for the surgeon operating with the surgical microscope 100, the regions of the object field are illuminated with these regions being viewable in the binocular viewing unit of the surgical microscope. At the same time, it is so effected that tissue structures, which lie outside of the viewing area of the surgical microscope, are not subject to unnecessary loading by the illuminating light. More specifically, these tissue structures of the patient are protected against unwanted warming.

Figure 2:
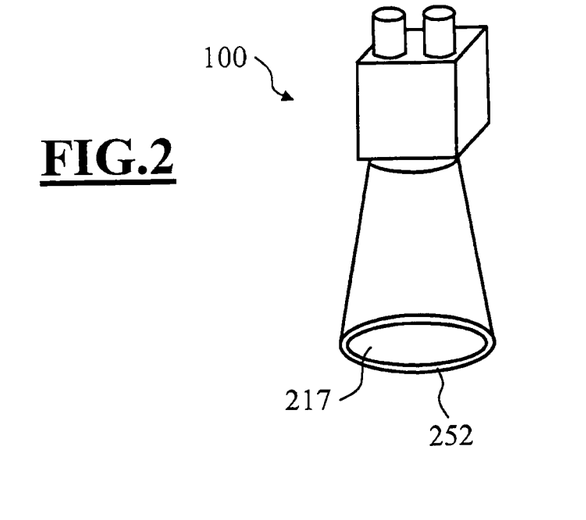
FIG. 2 shows an illuminated area and a viewing area of the surgical microscope at low magnification.

FIG. 2 is a schematic of the surgical microscope 100 of FIG. 1 for an adjustment of the viewing optic and the illuminating optic for low magnifications. The illuminated area 152 covers the viewing area 217 and, with respect to its size, the illuminated area corresponds to the size of the viewing area 217.

Figure 3:
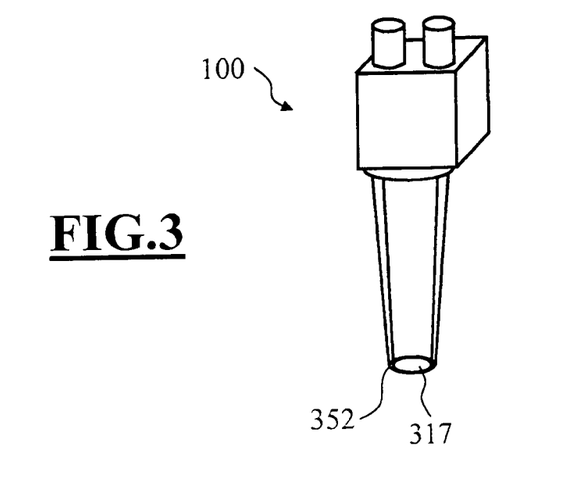
FIG. 3 shows an illuminated area and a viewing area of the surgical microscope at high magnification.

FIG. 3 schematically shows the surgical microscope 100 of FIG. 1 for an adjustment of the viewing optic and the illuminating optic for high magnification. The illuminating area 352 likewise covers the viewing area 317 and again has a size which corresponds to the size of the viewing area.

Figure 4:
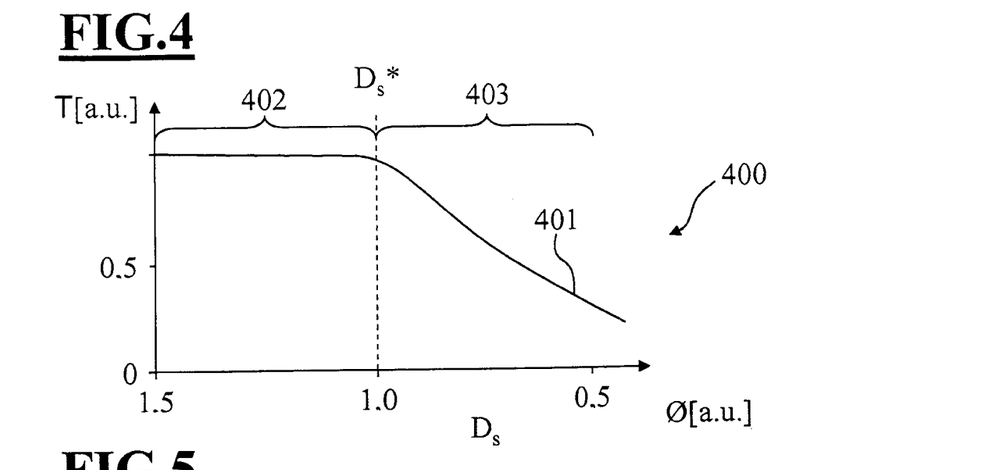
FIG. 4 is a graph showing the transmission of the viewing optic in the surgical microscope of FIG. 1 as a function of different viewing area diameters.

FIG. 4 shows a diagram 400 wherein, with a curve 401, the transmission T of the viewing optic (101, 104, 115) is plotted against corresponding diameters of the viewing area for the surgical microscope 100, more specifically, the ratio of the light quantity, which exits from the ocular optic 115, is plotted against the light quantity from the object region 116 by the microscope main objective system 101. The diameter $D_S$ of the viewing area changes when changing the magnification of the viewing optic (101, 104, 115), for example, the magnification system 104 is adjusted or the focus of the microscope main objective system 101 is shifted. For the form of the surgical microscope 100 of FIG. 1, it applies that with increasing magnification, the diameter $D_S$ of the viewing area reduces monotonically, that is, the size of the viewing area and the diameter thereof is clearly reversibly linked to the optical magnification of the viewing optic (101, 104, 115) in the optic system.

The transmission T of the viewing optic (101, 104, 115) in the surgical microscope 100 of FIG. 1 as a function of the viewing area diameter has a first section 402 wherein the magnification is comparatively small. In section 402, the transmission T of the viewing optic (101, 104, 115) changes practically not at all with increasing magnification, that is, with decreasing diameter $D_S$ of the viewing area.

This behavior of the transmission T of the viewing optic changes with a specific magnification which corresponds to a characteristic viewing area diameter $D_S^*$. Above this magnification, the transmission behavior T of the viewing optic decreases greatly in a second section 403 with increasing magnification. In diagram 400, the characteristic viewing area diameter $D_S^*$ delimits the section 402 with respect to the section 403 of the curve 401 for the transmission T of the viewing optic.

In the surgical microscope 100 of FIG. 1, the illuminated area 152 is adapted to the size of the viewing area 117 for a comparatively low magnification in that the adjustable optic component assembly 180 in the illuminating system 150 is so varied that a bundling of the illuminating light takes place with a reduction of the viewing area by increasing the magnification of the viewing optic. An increase of the illuminance B in the illuminated area 152 of the illuminating light in the surgical microscope 100 of FIG. 1 accompanies a bundling of the illuminating light. In order to compensate for this increase in light intensity, the intensity of the illuminating light 156, which illuminates the illuminated field diaphragm 157 in the system, is attenuated by adjusting the lamp power of the xenon lamp 153 and by adjusting the apertured diaphragm 154.

Figure 5:
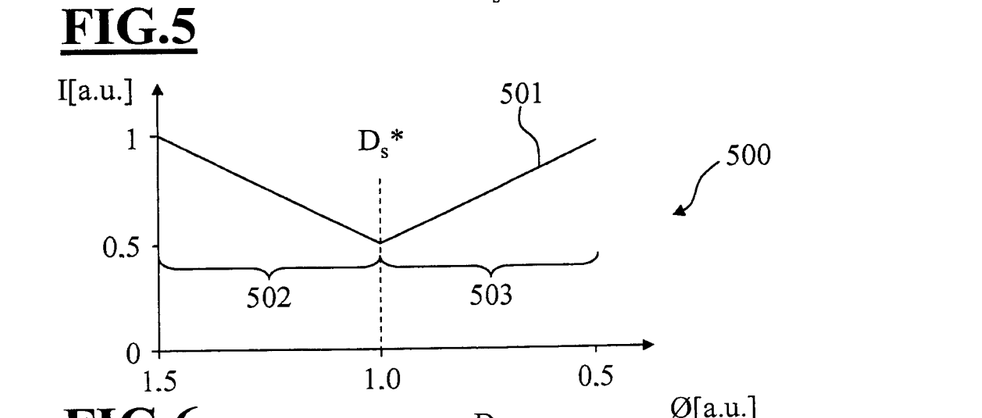
FIG. 5 is a graph showing the intensity of the illuminating light in the illuminating system of the surgical microscope as a function of differently adjusted illuminated area diameters.

Illuminating light 156 illuminates the illuminated field diaphragm 157 in the illuminating system 150 of the surgical microscope 100 of FIG. 1. FIG. 5 presents a diagram 500 with a curve 501 which shows, qualitatively, the intensity of the illuminating light 156 plotted in dependence upon the illuminated area diameter $D_L$ adjusted with the system.

Figure 6:
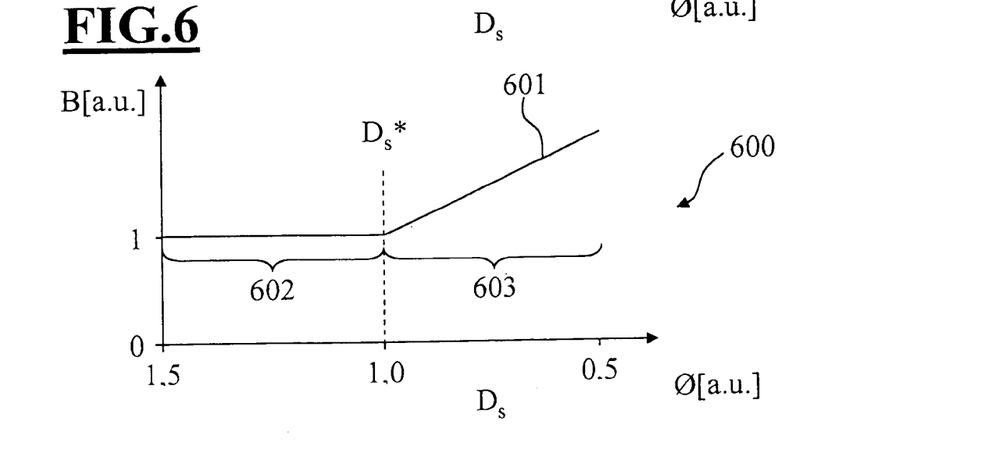
FIG. 6 shows the illuminance of the illuminating light in the object region as a function of different illuminated area diameters; and, FIGS. 7, 8 and 9 show a component assembly in the surgical microscope of FIG. 1.

In FIG. 5, the first section 502 corresponds to the section 402 of FIG. 4. In the first section 502, the light intensity I decreases with increasing magnification. In a second section 503, which corresponds to the second section 403 of FIG. 4, the intensity I increases with increasing magnification. The adjustment of the illuminating system 150 is especially matched to the magnification adjusted with the viewing optic (101, 104, 115) in such a manner that the illuminance B of the illuminating light in the illuminated area in the object region has the course corresponding to the curve 601 shown in FIG. 6 by the diagram 600. More specifically, the illuminating system control unit 175 in the surgical microscope 100 of FIG. 1 controls the illuminating system 150 in dependence upon the adjusted magnification of the viewing optic (101, 104, 115) in such a manner that, in a first magnification range 602, the size of the illuminated area 152 at constant illuminance B of the illuminating light in the object region 116 is varied and, in a second magnification range 603, the size of the illuminated area 152 is adjusted by changing the illuminance B. The illuminating system 150 in the surgical microscope 100 of FIG. 1 is so controlled that the brightness impression of the viewed image in the binocular tube 113 is constant for a viewing person over the entire magnification range adjusted with the viewing optic (101, 104, 115) in the surgical microscope 100.

For adjusting the illuminated area 152 and the illuminance B of the illuminating light in the object region 116, the illuminated field diaphragm 157 and the optic unit 158 are adjusted in the illuminating system 150 of the surgical microscope 100 by means of the adjusting unit 178 via a motorized actuating element and, at the same time, the intensity of the illuminating light 156 is adapted with this light being made available by the xenon lamp 153 at the illuminated field diaphragm 157.

The coupling of the illuminated area and viewing area in the surgical microscope 100 requires that the illuminating system must be designed for a very high number of operating cycles because, with each adjustment of the viewing optic in the surgical microscope, the illuminating system is also varied. It is assumed that for a coupling of the viewing optic and the illuminating system in the surgical microscope, the illuminating system is adjusted 220,000 times in a time span of 10 years. In this case, a powerful drive is needed in the adjusting mechanism for the illuminated field diaphragm in the illuminating system because frequent movements of corresponding lamellae in the illuminated field diaphragm in order to reduce the opening of the lamellae or to increase the opening cause wear of the movable units of the diaphragm because of friction. Over a time span of 10 years, this can mean that the adjusting force, which is needed for a movement of the illuminated field diaphragm, increases by more than 20 times approximately 0.05 N to greater than 1.00 N. For these high adjusting forces, a return spring is, as a rule, not designed with this return spring being conventional in illuminated field diaphragms. In order to nonetheless ensure a reliable adjustment of the diaphragm over a correspondingly long time span, it must be ensured that, for the adjustment of the illuminated field diaphragm in each operating situation, an adequately large adjusting force is introduced into the diaphragm.

The coupling of the illuminated area and the viewing area as in the surgical microscope 100 therefore requires a correspondingly robust structure of the illuminating system 150 provided therein.

Figure 7:
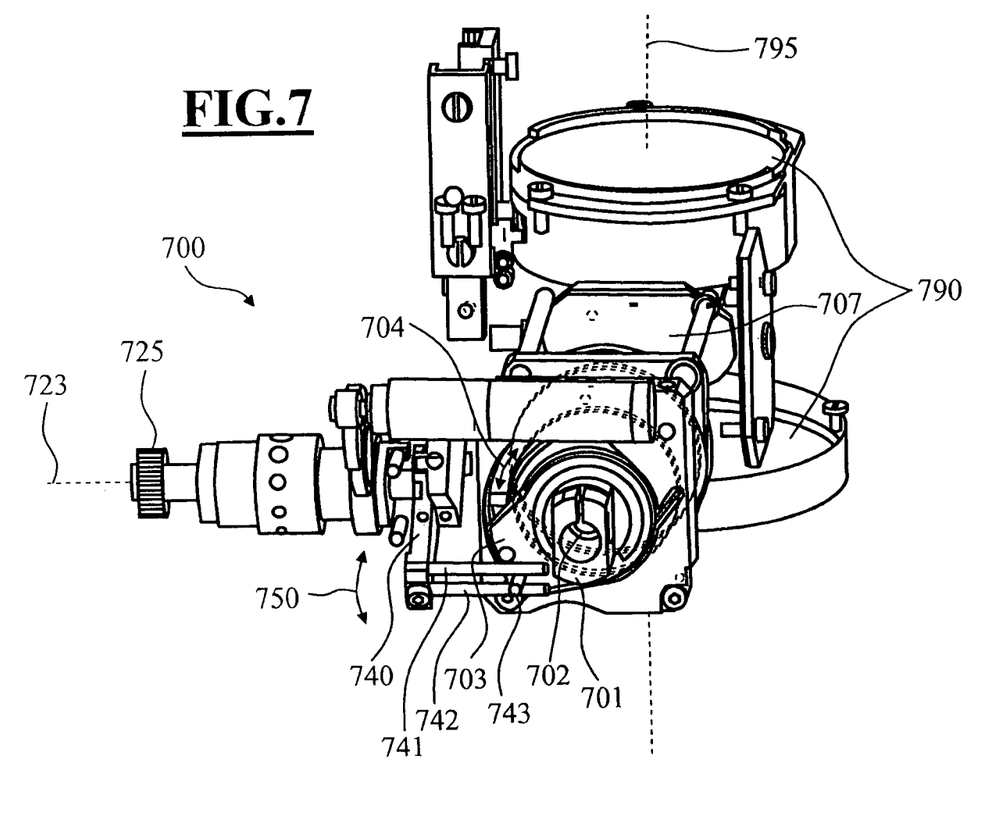
Figure 8:
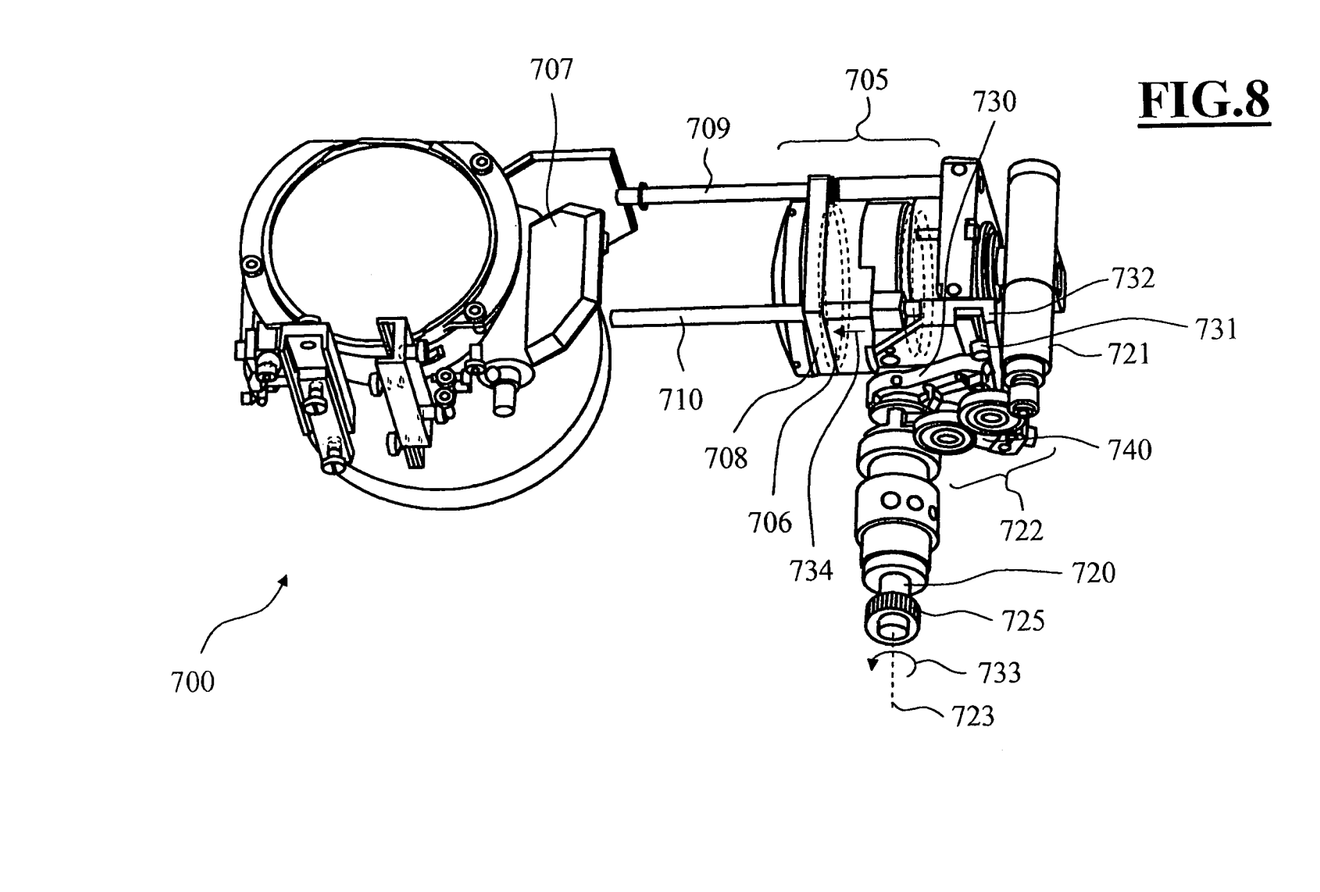
Figure 9:
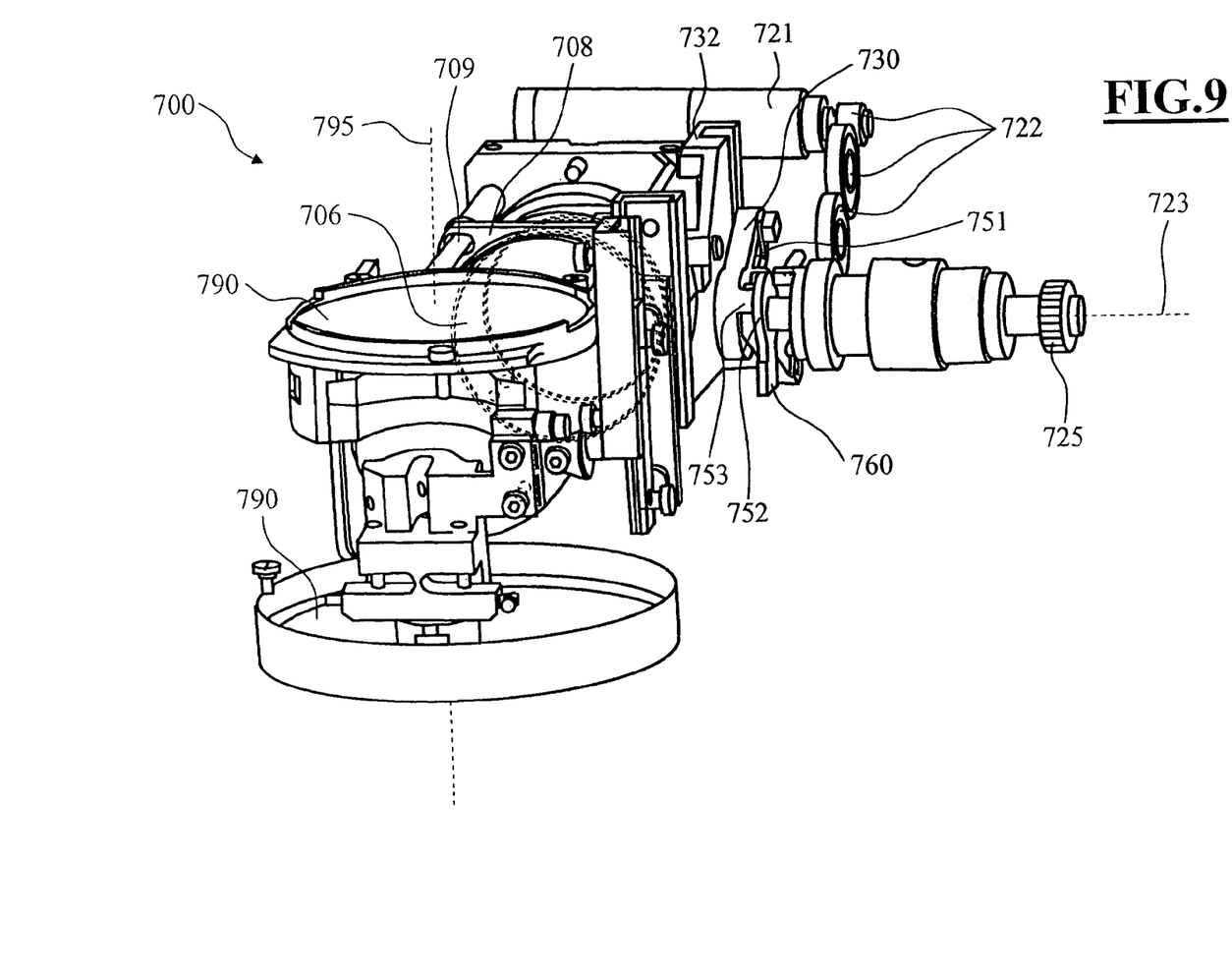

FIGS. 7, 8 and 9 show a component assembly 700 in the surgical microscope 100 which complies with these requirements. FIGS. 7, 8 and 9 show different perspectives of the component assembly 700.

The component assembly 700 includes the adjustable microscope main objective 790 defining an optical axis 795 and includes a receptacle 701 for a light conductor (not shown). The illuminated field diaphragm 702 of the surgical microscope is mounted behind this receptacle. The illuminated field diaphragm 702 is configured to be adjustable and can be opened and closed by moving an adjusting element 703 in correspondence to the double arrow 704.

The component assembly 700 contains an illuminating optic 705 having an illuminating lens 706 and an illuminating mirror 707. The illuminating lens 706 is held in a holder 708 which is movably supported on guide rails (709, 710). Depending upon the position of the illuminating lens 706 along the guide rails (709, 710), the illuminating light, which exits from the illuminated field diaphragm 702, is guided more or less intensely bundled to the illuminating mirror 707 which directs the light to the object region of the surgical microscope.

The component assembly includes a drive shaft 720 as a common drive element for the illuminated field diaphragm 702 and the holder 708 of the illuminating lens 706. A positioning motor 721 having a gear assembly 722 is assigned to the drive shaft 720. The positioning motor 721 acts on the drive shaft 720 via the gear assembly 722 and moves the drive shaft about a rotational axis 723. Furthermore, a rotary knob 725 is assigned to the drive shaft in order to ensure a manual movement of the drive shaft 720.

The component assembly 700 includes a first drive lever 730. This first drive lever 730 is rigidly connected to the drive shaft 720. The lever acts with a roller bearing 731 on a guide sled 732 which is connected to the holder 708 for the illuminating lens 706. By rotating the drive shaft 720 about the rotational axis 723 in the rotational direction indicated by arrow 733, the guide sled 732 is moved in the direction of arrow 734.

A second drive lever 740 is provided in the component assembly 700 for adjusting the illuminated field diaphragm 702. This second lever 740 is rotatably supported about the rotational axis 723 of the drive shaft 720. Two guide rails (741, 742) are formed on the second drive lever which act upon an actuating lug 743 on the positioning element of the illuminated field diaphragm 702.

By rotating the drive shaft 720, the second drive lever 740 is moved only in a specific rotational range of the drive shaft 720 in correspondence to the double arrow 750. This rotational movement is transferred via the guide rails (741, 742) to the actuating lug 743 of the illuminated field diaphragm 702 for a displacement movement which corresponds to the double arrow 704.

An entraining element 760 arranged spatially fixed to the drive shaft 720 is provided for coupling drive shaft 720 and the second drive lever 740. This entraining element 760 controls a latching device 751. This latching device 751 acts via a spring element (not shown) on the entraining element 760 and is moved in correspondence to a control curve 752 formed on the entraining element. In a specific rotational position of the first drive lever 730, this drive lever works on the second drive lever 740 with an entraining nose 753 and the latch device 751. A rotational movement of the drive shaft 720 is then also transmitted to the second drive lever 740. In this way, an adjusting mechanism for the illuminated field diaphragm 702 is provided which can introduce a drive force into the adjusting element 703 of the illuminated field diaphragm 702 for opening the diaphragm as well as for closing the diaphragm.

In the surgical microscope 100 shown in FIG. 1, a coupling of the illuminated area, which is generated by the illuminating system 150, to the viewing area of the viewing optic (101, 104, 115) is realized. It is advantageous, to optionally provide in the surgical microscope also the possibility of controlling the illuminated field independently of the adjustment of the viewing optic. For this purpose; a switchable coupling mechanism of illuminated area and viewing area is integrated into the surgical microscope.

It is understood that the foregoing description is that of the preferred embodiments of the invention and that various changes and modifications may be made thereto without departing from the spirit and scope of the invention as defined in the appended claims.

What is claimed is:

1. A surgical microscope comprising:
   a viewing optic for enabling a viewer to view a magnified representation of a region of an object in a viewing area;
   said viewing optic defining a viewing beam path and including a continuously adjustable magnification system arranged in said viewing beam path;
   a viewing-optic adjusting unit assigned to said magnification system;

an adjustable illuminating system for making illuminating light available for illuminating the object region in an adjustable illuminated area thereof with said illuminating light;

said illuminating system including: a light source for supplying said illuminating light a unit for adjusting an illuminating luminous flux of said illuminating light from said light source; and, an optic component assembly for adjusting the size of said illuminated area;

an illuminating-system control unit connected to said viewing-optic adjusting unit and being adapted to receive information as to the adjusted magnification of said viewing optic;

said illuminating-system control unit being operatively connected to said illuminating system for adjusting said illuminating system to adapt the size of said illuminated area to the size of said viewing area; and, said illuminating-system control unit controlling said illuminating system in dependence upon the adjusted magnification of said viewing optic so as to adapt, in a first magnification range, wherein a transmission of said viewing optic is substantially constant, the size of said illuminated area in said object region while a constant irradiation intensity of said illuminating light is maintained and to adapt, in a second magnification range lying above said first magnification range, wherein the transmission of said viewing optic in said second magnification range decreases with increasing magnification, the size of said illuminated area while said irradiation intensity is simultaneously changed, so that the brightness impression of viewed images for the viewer is constant over said first magnification range and over said second magnification range.

2. The surgical microscope of claim 1, wherein said adjustable optic component assembly includes at least one displaceable lens element.

3. The surgical microscope of claim 2, wherein said adjustable optic component assembly includes an adjustable illuminated field diaphragm.

4. The surgical microscope of claim 3, wherein said optic component assembly further comprises a common drive unit for displacing said lens element and adjusting said illuminated field diaphragm.

5. The surgical microscope of claim 4, wherein said drive unit comprises a rotatable shaft.

6. The surgical microscope of claim 5, wherein said common drive unit further comprises an electric motor operatively connected to said rotatable shaft.

7. The surgical microscope of claim 5, wherein said common drive unit further comprises a rotary knob assigned to said rotatable shaft.

8. The surgical microscope of claim 4, further comprising an illuminated field diaphragm adjusting mechanism; and, said common drive unit acting on said illuminated field diaphragm adjusting mechanism so as to cause a drive force, which is introduced into said common drive unit, to be transmitted to said illuminated field diaphragm when opening said illuminated field diaphragm and when closing said illuminated field diaphragm.

9. The surgical microscope of claim 1, wherein said illuminating system further comprises an apertured diaphragm for adjusting an illuminating light flux.

10. The surgical microscope of claim 1, further comprising an adjusting unit assigned to said magnification system for adjusting the magnification of said viewing optic to a value selectable by the viewer.

11. A surgical microscope comprising:

a viewing optic for enabling a viewer to view a magnified representation of a region of an object in a viewing area with a constant brightness impression;

said viewing optic including a continuously adjustable magnification system to which a viewing-optic adjusting unit is assigned;

an adjustable illuminating system for making illuminating light available for illuminating the object region in an adjustable illuminated area thereof with said illuminating light;

said illumination system including: a light source for supplying said illuminating light; a unit for adjusting an illuminating luminous flux of said illuminating light from said light source; and an adjustable optic component assembly for adjusting the size of said illuminated area, comprising at least one adjustable illuminated field diaphragm and at least one displaceable lens element;

an illuminating-system control unit connected to said viewing-optic adjusting unit and being adapted to receive information as to the adjusted magnification of said viewing optic, said illuminating-system control unit being operatively connected to said illumination system for adjusting said illumination system to adapt the size of said illuminated area to the size of said viewing area;

said illuminating-system control unit controlling said illumination system in dependence upon the adjusted magnification of said viewing optic so as to adapt, in a first magnification range, the size of said illuminated area in said object region while maintaining a constant irradiation intensity of said illuminating light by adjusting said displaceable lens element, and to adapt, in a second magnification range lying above said first magnification range, the size of said illuminated area by adjusting said adjustable illuminated field diaphragm while simultaneously changing said irradiation intensity, so that the brightness impression of viewed images for the viewer is constant over the first magnification range and the second magnification range.

* * * * *

UNITED STATES PATENT AND TRADEMARK OFFICE
CERTIFICATE OF CORRECTION

PATENT NO.       : 8,520,303 B2              Page 1 of 1
APPLICATION NO.  : 12/662984
DATED            : August 27, 2013
INVENTOR(S)      : Joachim Steffen et al.

It is certified that error appears in the above-identified patent and that said Letters Patent is hereby corrected as shown below:

In the Specification

In Column 8:
Line 51: delete "purpose;" and substitute -- purpose, -- therefor.

In the Claims

In Column 9:
Line 6: delete "light a" and substitute -- light; a -- therefor.

Signed and Sealed this
Twelfth Day of November, 2013

Teresa Stanek Rea
*Deputy Director of the United States Patent and Trademark Office*